United States Patent
Matsuura

[11] Patent Number: 5,400,682
[45] Date of Patent: Mar. 28, 1995

[54] METHOD OF SIDE-CUTTING BY TURRET PUNCH PRESS

[75] Inventor: Satoshi Matsuura, Ishikawa, Japan

[73] Assignee: Kabushiki Kaisha Komatsu Seisakusho, Japan

[21] Appl. No.: 983,852

[22] PCT Filed: Sep. 13, 1991

[86] PCT No.: PCT/JP91/01222
§ 371 Date: Mar. 4, 1993
§ 102(e) Date: Mar. 4, 1993

[87] PCT Pub. No.: WO92/04995
PCT Pub. Date: Apr. 2, 1992

[30] Foreign Application Priority Data
Sep. 14, 1990 [JP] Japan .................. 2-242472

[51] Int. Cl.$^6$ ............... B21D 28/26; B21D 28/36
[52] U.S. Cl. ........................... 83/49; 83/139; 83/530; 83/682; 83/916
[58] Field of Search ............... 89/36, 35, 49, 50, 139, 89/140, 552, 571, 916, 55, 530, 681, 682

[56] References Cited
U.S. PATENT DOCUMENTS

| 4,250,785 | 2/1981 | Morishita | 83/552 |
| 4,738,173 | 4/1988 | Kiuch | 83/916 |
| 4,771,663 | 9/1988 | Naito et al. | 83/49 |
| 4,986,153 | 1/1991 | Matrak et al. | 83/552 |
| 5,044,239 | 9/1991 | Endo et al. | 83/552 |

FOREIGN PATENT DOCUMENTS

| 54-127081 | 10/1979 | Japan . |
| 63-130227 | 6/1988 | Japan . |
| 63-130228 | 6/1988 | Japan . |

Primary Examiner—Hien H. Phan
Attorney, Agent, or Firm—Ronald P. Kananen

[57] ABSTRACT

A method of side-cutting by a turret punch press for improving working efficiency to a large extent. The method comprises a step in which a selected one ($5_1$) of a plurality of punch chips ($5_1$ to $5_4$) arranged so as to be selectively hit in a punch assembly (1) provided on the upper turret (2) is used for side-cutting a workpiece (6) and the other step in which one end of a part to be cut into a punching piece with the side cutting is cut off by another punch chip ($5_2$).

8 Claims, 7 Drawing Sheets

METHOD OF SIDE-CUTTING BY TURRET PUNCH PRESS

FIELD OF THE INVENTION

The present invention relates to a method of side cutting by a turret punch press for punching a plate form work.

BACKGROUND OF THE INVENTION

A turret punch press is designed to include an upper turret and a lower turret and to punch a plate form workpiece between a punch provided on the upper turret and a die provided on the lower turret.

On the other hand, it is possible to perform a side cutting for cutting a workpiece by continuously moving the above-mentioned punch up and down. As the side-cutting method, a method disclosed in Japanese Unexamined Patent Publication No., 63-130228 is known.

The side cutting method disclosed in the above-identified publication is that a punch provided with three stage edges, i.e. an upper edge, an intermediate edge and a lower edge, is driven up and down by means of a hydraulic cylinder for performing the side-cutting with the lower and intermediate edges, punching piece retained in a die is cut by means of the upper edge when a predetermined amount of the punching piece is retained, and the side cutting is again performed thereafter. The lower, intermediate and upper edges to be used for cutting are selected by controlling the stroke of the hydraulic cylinder.

However, in the above-mentioned side cutting method, since the punch is driven through a substantially small stroke to perform the side cutting with the lower and the intermediate edges, a dimension to be cut in a single stroke is relatively small and such as to require long process period. Furthermore, a saw-tooth like trace is frequently formed along the cutting surface to degrade the product quality.

Further, since the punching piece is cut while it is retained in a predetermined position in the die, a drooping can be created on the workpiece to degrade the product quality when the side cutting process is performed along a relatively long dimension.

SUMMARY OF THE INVENTION

In view of the problems set forth above, it is a primary object of the present invention to provide a side cutting method which utilizes a turret punch press and which permits longer dimension in one stroke of a punch chip so as to significantly improve the processing efficiency.

Another object of the invention is to provide a side cutting method which utilizes a turret punch press which can avoid the formation of a residual drooping portion on the cut portion and further reduce the formation of a saw-tooth like trace along a steering surface.

In order to accomplish the above-mentioned primary object, there is provided, in accordance with the first aspect of the present invention, a method of side-cutting by a turret punch press comprising the steps of performing a side cutting for a workpiece with predetermined one of a plurality of punch chips which are provided in a punch assembly mounted on an upper turret and adapted to be selectively impacted, and cutting off one end of a portion to be a punching piece by cutting in the side-cutting process by means of another one of punch chips.

In order to accomplish above-mentioned various objects, there is provided, in accordance with the second aspect of the invention, a method of side-cutting by a turret punch press comprising the steps of performing a side cutting for a workpiece with predetermined one of a plurality of punch chips which are provided in a punch assembly mounted on an upper turret and adapted to be selectively impacted, cutting off one end of a portion to be a punching piece by cutting in the side-cutting process by means of another one of punch chips, and again performing the side cutting with the one of the punch chips continuing from a remained cut portion, and repeating a cycle consisted of the each steps.

The present invention achieves the following advantages. Namely, using one of a plurality of punch chip provided in a punch assembly, the side-cutting process for the workpiece is performed, initially. Then, the punching piece formed by the side-cutting is cut off by means of another punch chip. Repeating the foregoing operation, the side-cutting of the workpiece into the desired configuration is performed. Therefore, the length to be cut in one stroke of the punch chip can be longer than the conventional side-cutting method to significantly improve the working efficiency. Also, upon cutting off of the punching piece, a part of the cut portion is left so that side-cutting is performed subsequently with continuing from the cut portion. By this, it becomes possible to perform side cutting without forming the drooped trace.

In addition, with this method, since the length of side cutting in one stroke can be made longer, it can reduce the saw-tooth like trace to be formed on the shearing surface.

Above-mentioned and other objects of the present invention, aspects and advantages will become clear to those skilled in the art with the following descriptions and associated drawings illustrating preferred embodiment exemplarily shown in consistent with the principle of the invention.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention but are for explanation and understanding only.

DETAILED DESCRIPTION OF THE INVENTION

Figure 1:
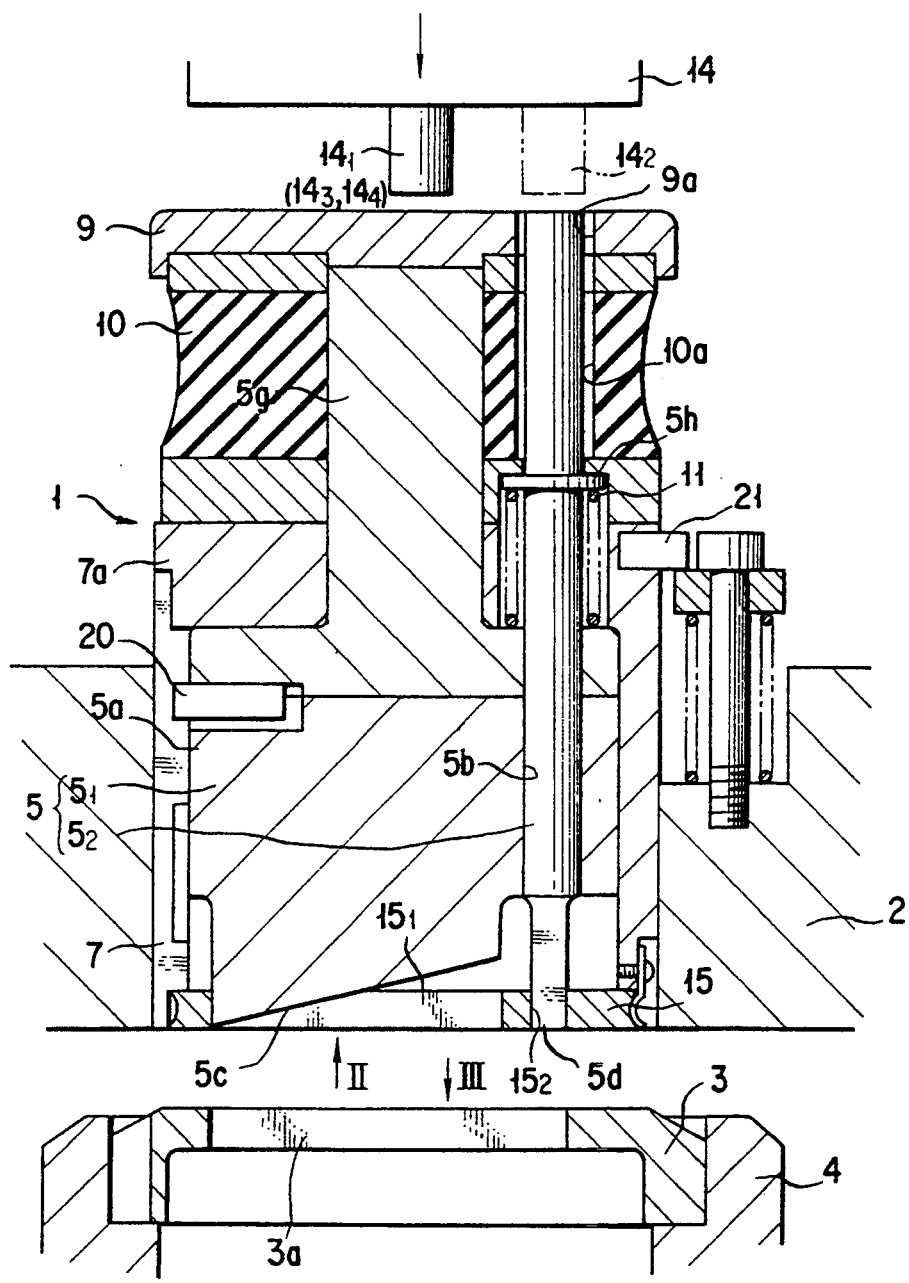
FIG. 1 is a fragmentary longitudinal section of a major portion of a turret punch press for implementing the preferred method according to the present invention.

A side cutting method according to the present invention will be discussed hereinafter in greater detail with reference to the accompanying drawings.

In the drawings, the reference numeral 1 denotes a punch assembly mounted on an upper turret 2 of a turret punch press, 3 denotes a die mounted on a lower turret 4. A side cutting process for a plate form workpiece 6 can be performed between the punch chip 5 and the die 3 of the punch assembly 1.

The punch assembly 1 includes a cylindrical punch guide 7, as shown in FIG. 1. The punch chip 5 is disposed within the punch guide 7 for vertical sliding movement.

The punch chip 5 comprises a large diameter punch chip $5_1$ having a body $5a$ disposed within the punch guide 7 for vertical sliding movement, and a plurality of, such as three, smaller diameter punch chips $5_2$, $5_3$ and $5_4$ disposed in a plurality of guide holes $5b$ formed through the body $5a$ for vertical sliding movement. The punch chip $5_1$ has a rectangular tip end, on which a cutting edge $5c$ with a lower face tapered in the vertical direction so that the side cutting process for a workpiece 6 can be performed with the cutting edge $5c$ and a rectangular cutting slot formed in the die 3.

The punch chip $5_2$ is arranged co-axially with the cutting edge $5c$ and has a tip end, on which a square cutting edge $5d$ having the same width to the cutting edge $5c$ is formed so that punching piece $6a$ can be cut off by means of the cutting edge $5d$.

Figure 2:
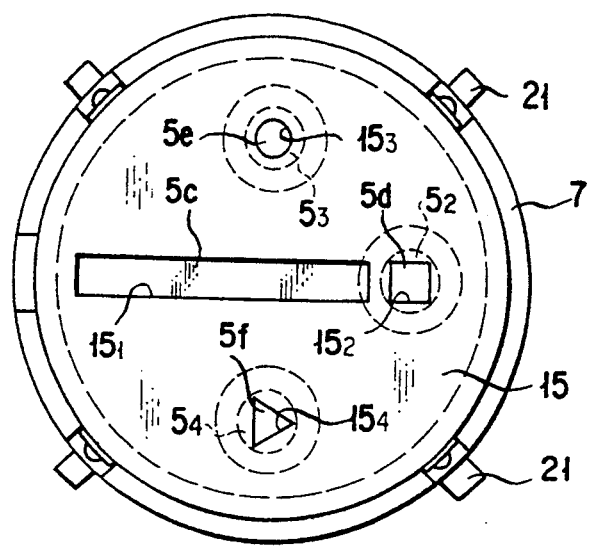
FIG. 2 is an illustration as viewed along an arrow II in FIG. 1.

The remaining punch chips $5_3$ and $5_4$ are arranged at both sides of the punch chip $5_1$ as shown in FIG. 2. Circular and triangular cutting edges $5e$ and $5f$ are formed on the chip ends of the punch chips $5_3$ and $5_4$.

On the other hand, the punch chip $5_1$ has an upper end portion having smaller diameter. The smaller diameter portion $5g$ fixedly mounts a punch head 9, center of which is adapted to receive an impact by an striker $14_1$ discussed later. Between the punch head 9 and an upper plate $7a$ provided on the upper end of the punch guide 7, a stripping spring 10 formed of a resilient or an elastic body, such as a rubber, is disposed for urging the punch chip $5_1$ upwardly.

The upper ends of other punch chips $5_2$ to $5_4$ are extended around the smaller diameter portion $5g$ and reach through openings $9a$ formed through the punch head 9 through through holes $10a$ defined in the stripping spring 10. The upper ends of the punch chips $5_2$ to $5_4$ are arranged substantially in flush with the upper surface of the punch head 9.

Between spring seats $5h$ formed at positions slightly above the intermediate portions of respective punch chips $5_2$ to $5_4$ and the upper surface of the body $5a$ of the punch chip $5_1$, stripping springs 11 comprising coil springs are disposed. With these stripping springs 11, respective punch chips $5_2$ to $5_4$ are biased upwardly.

On the other hand, at an impacting position of the turret punch press, a ram 14 which is adapted to be driven vertically by means of a not shown drive mechanism. A plurality of strikers $14_1$, $14_2$, $14_3$ and $14_4$ are provided on the lower surface of the ram 14 for projecting and contracting with respect thereto.

The strikers $14_1$ to $14_4$ are arranged at corresponding positions to a plurality of punch chips $5_1$ to $5_4$ provided in the punch assembly 1. By driving the ram 14 vertically with selectively projecting the strikers $14_1$ to $14_4$, the punch chips $5_1$ to $5_4$ corresponding to these strikers $14_1$ to $14_4$ can be impacted.

Figure 3:
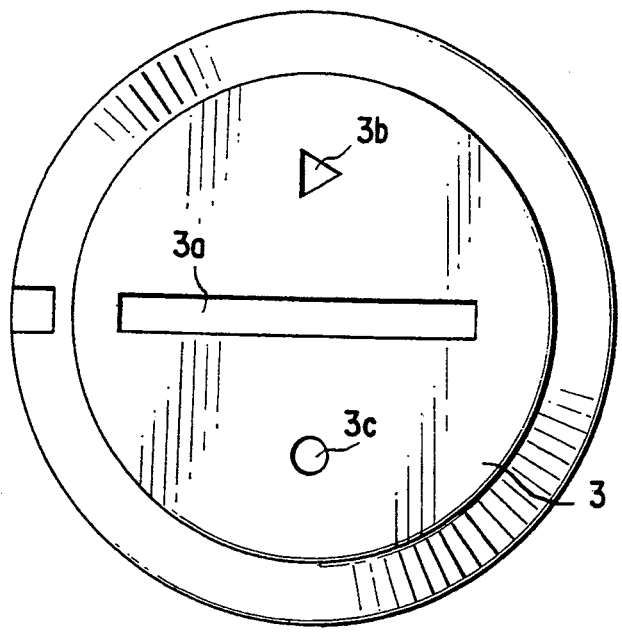
FIG. 3 is an illustration as viewed along an arrow III in FIG. 1.
Figure 4:
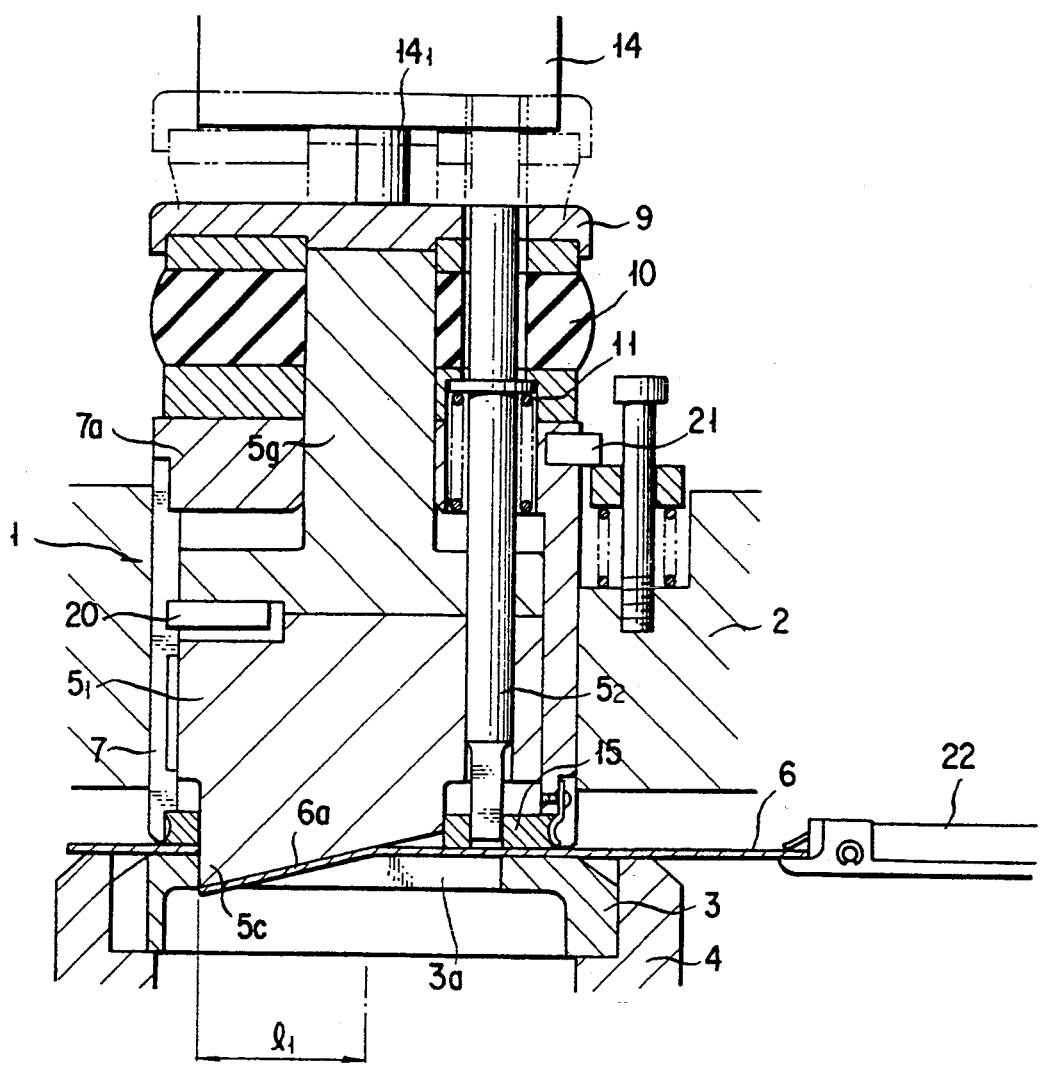
FIGS. 4 and 5 are illustrations showing operation of the method according to the invention.

By impact given by the strikers $14_1$ to $14_4$, one of the chips $5_1$ to $5_4$ is driven downwardly to extend the cutting edges $5c$, $5d$, $5e$ and $5f$ provided at the tip ends thereof downward from the holes $15_1$ to $15_4$ of a stripper plate 15 provided on the lower end of the punch guide 7. Thus, as shown in FIG. 3, the cutting edge $5c$, $5d$, $5e$ and $5f$ can perform punching of the workpiece with the cutting slots $3a$, $3b$ and $3c$ formed in the die 3 at corresponding positions thereto.

It should be noted that, in the drawings, the reference numeral 20 denotes a positioning key for positioning the punch chip 5 relative to the punch guide 7, 21 denotes a positioning key for performing positioning of the punch assembly 1 relative to the upper turret 2.

Next, discussion will be given for a process for side cutting of the workpiece 6 using a die apparatus composed of the punch assembly 1 and the die 3, with reference to FIGS. 4 to 8.

During side cutting of the workpiece 6, the workpiece 6 is initially moved by a clamp 22 for setting the side cutting start position of the workpiece 6 at a punch position. The clamp 22 is designed to clamp the workpiece 6 and move the latter relative to the punch assembly in per se known manner. Then, the side cutting process is initiated by projecting the striker $14_1$ from the lower end of the ram 14 for impacting the punch chip $15_1$.

By downward motion of the ram 14, the striker $14_1$ impacts the punch head 9 corresponding to punch chip $15_1$. Thus, the punch chip $15_1$ is moved downwardly against the stripping spring 10 to extend the cutting edge $5c$ at the lower end of the punch chip $5_1$ from the hole $15_1$ of the stripper plate 15. Thus, the workpiece 6 is cut in the length $l_1$ between the cutting edge $5c$ and the die 3.

Figure 5:
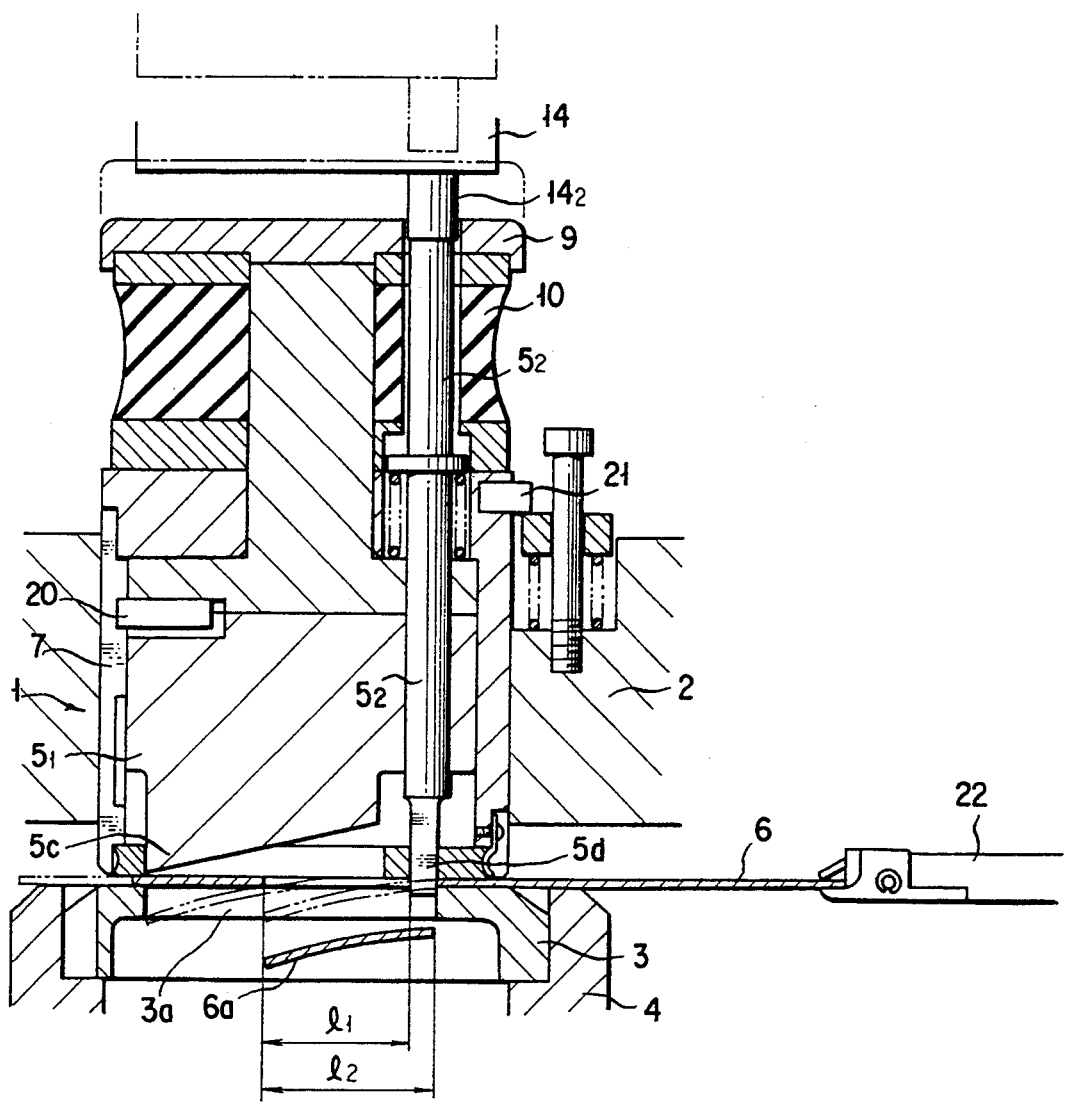
Figure 6A:
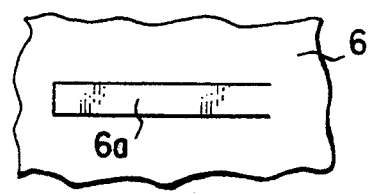
FIGS. 6A through 6D, 7 and 8 are illustrations showing operations of other side cutting methods of the present invention.
Figure 6B:
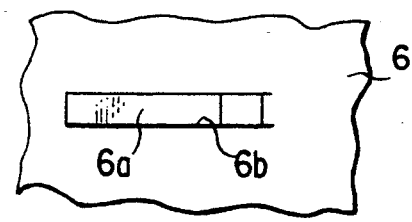
Figure 6C:
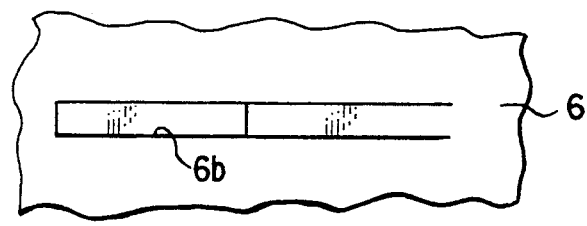
Figure 6D:
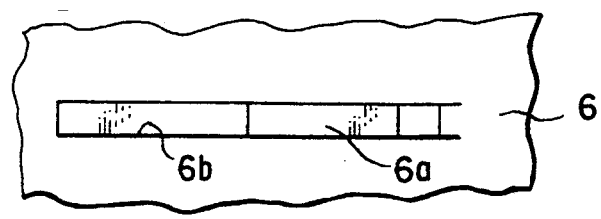

Subsequently, according to upward motion of the of the punch chip $5_1$, the striker $14_1$ is retracted. Then, the striker $14_2$ necessary for the next operation is projected and the punch chip $5_2$ is impacted from the above by downward movement of the ram 14, as shown in FIG. 5.

By this, the punch chip $5_2$ is moved downwardly to cut off the punching piece $6a$ cut by the punch chip $5_1$m between the cutting edge $5d$ of the punch chip $5_2$ and the die 3. Thus, a rectangular hole of the length $l_2$ is formed in the workpiece 6.

In this case, by making the vertical stroke of the ram 14 variable and thus making the vertical stroke of the punch chip $5_1$ variable, the length $l_2$ of the hole can be differentiated within a predetermined range.

It should be appreciated that although the punch chip $5_2$ is used in the foregoing process for cutting off the slug, the punch chip $5_3$ or $5_4$ may be used in place of the punch chip $5_2$.

Figure 7:
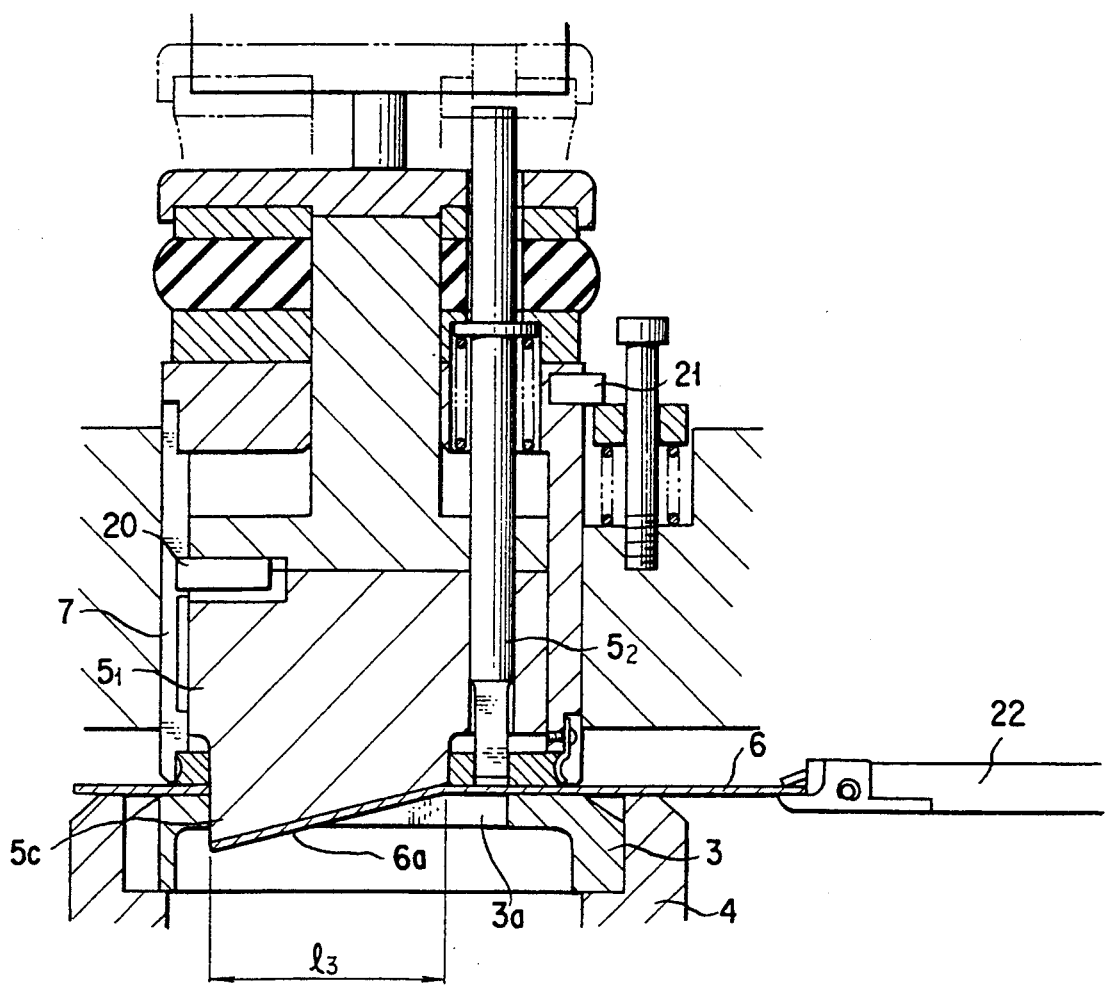
Figure 8:
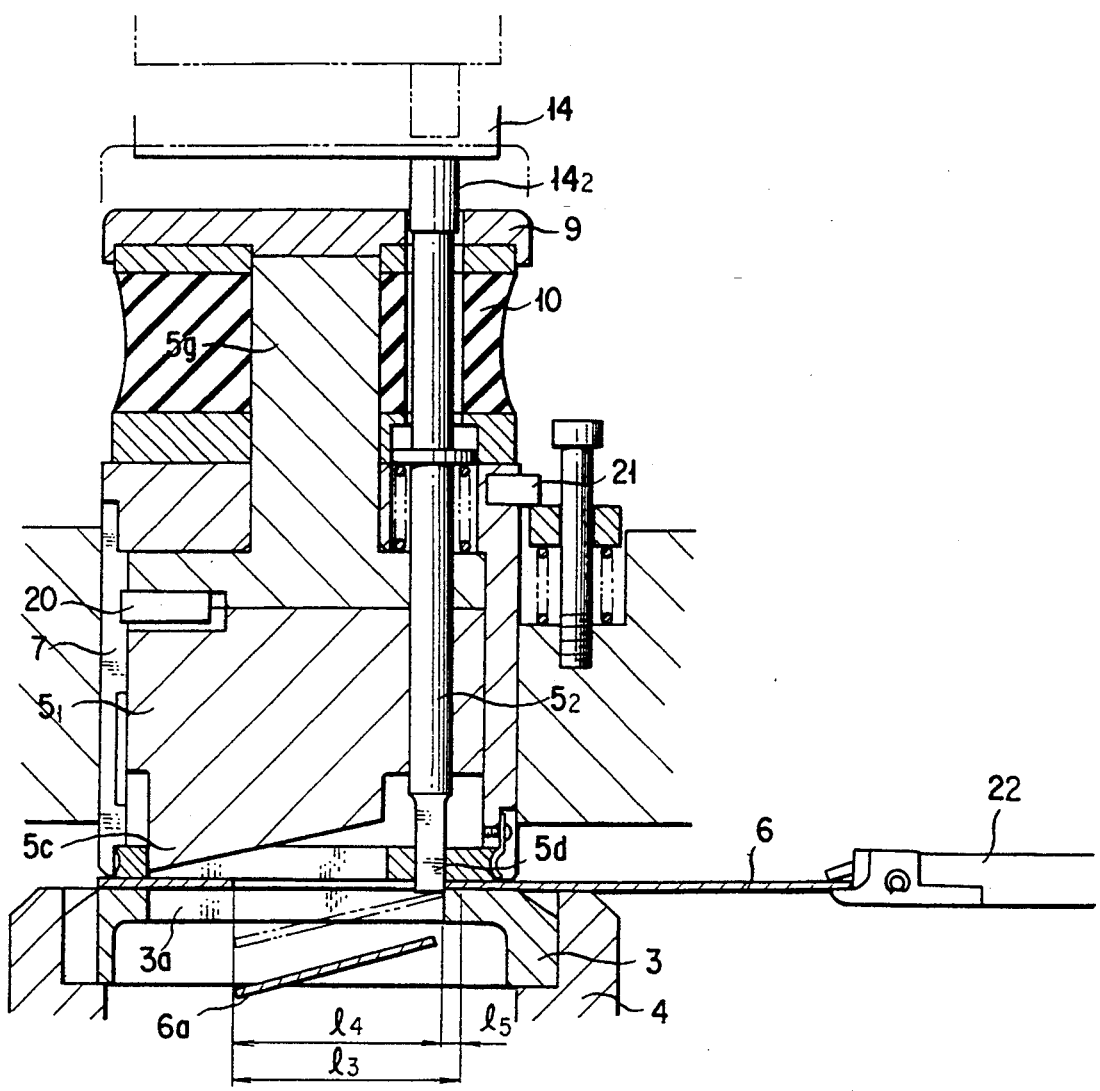

The foregoing is an example, in which the length $l_1$ is initially cut by the punch chip $5_1$ and subsequently, the punching piece $6a$ is cut off by the punch chip $5_2$ for forming the rectangular hole $6b$ in the length of $l_2$. Conversely, an example shown in FIG. 7 is adapted to initially cut a length $l_3$ by making the vertical stroke of the ram 14 variable, and then, as shown in FIG. 8, a length $l_4$ of the punching piece $6a$ is cut off by the punch chip $5_2$ with leaving the cut portion in the length $l_5$. Subsequently, the side cutting is continued following to the cut portion. With this process, it becomes possible to perform a side cutting process without leaving a drooping portion while reducing the saw-tooth like trace along the shearing surface, as shown in FIGS. 6A to 6D.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

I claim:

1. A method of side-cutting by a turret punch press comprising the steps of:
   providing a plurality of punch chips in a single punch assembly mounted on an upper turret, each of said punch chips being adapted to be individually and selectively impacted in a manner which drives them to their respective cutting positions;
   side-cutting a workpiece with a predetermined one of said plurality of punch chips by impacting the corresponding one of said plurality of punch chips so as to partially cut out a punching piece by cutting at least two parallel sides of said punching piece with a single stroke of said one punch chip, said partially cut out punching piece remaining attached to said workpiece at an end portion of said punching piece; and
   cutting off said punching piece from said workpiece by cutting said end portion of said partially cut out punching piece by completing the cutting produced by said side-cutting step using another one of punch chips.

2. A method of side-cutting using a turret punch press comprising the steps of:
   (a) providing a plurality of punch chips in a punch assembly mounted on an upper turret, each of said punch chips being adapted to be individually and selectively impacted;
   (b) performing a side-cutting of a workpiece with a predetermined one of said plurality of punch chips by impacting the corresponding one of said plurality of punch chips in a manner which partially cuts out a punching piece by cutting at least two parallel sides of said punching piece with a single stroke of said one punch chip, said partially cut out punching piece remaining attached to said workpiece at an end portion of said punching piece; and
   (c) cutting off said punching piece from said workpiece by cutting said end portion of said partially cut out punching piece by completing the cutting by said side-cutting using another one of said plurality of punch chips; and
   repeating steps (a), (b) and (c) on the remaining portion of said work piece.

3. A process for performing side-cutting using a turret punch including an upper turret carrying a punch assembly and a lower turret carrying a die, comprising the steps of:
   providing a first punch chip for performing a side-cutting of a workpiece in said punch assembly carried by said upper turret, said first punch chip being adapted to be selectively impacted for performing said side-cutting operation in a manner which partially cuts out a slug from said work piece;
   providing at least one second punch chip for cutting off said slug from the workpiece in said punch assembly, said second punch chip being adapted to be selectively impacted for performing said slug cutting off operation independently of said first punch;
   performing a side-cutting step, in which an impact is applied to said first punch chip for side-cutting a predetermined length of said workpiece in a manner which partially cuts out a slug which is to be removed from said work piece by cutting at least two parallel sides of said slug with a single stroke of said first punch chip;
   performing a slug cutting off step subsequent to said side-cutting step, in which an impact is applied to said second punch for cutting said slug completely free of said workpiece; and
   repeating said side-cutting step and said slug cutting off step.

4. A process as set forth in claim 3, wherein application of impact for said first and second punch chips is selectively performed by an impacting means including first and second impacting elements respectively corresponding to said first and second punch chips, which first and second impacting elements are movable between a working position and a resting position for impacting corresponding first and second punch chips, said process including a step of positioning said first impacting element corresponding to said first punch chip at said working position while maintaining said second impacting element at said resting position in advance of application of impact in said side-cutting step and a step of positioning said second impacting element corresponding to said second punch chip at said working position while maintaining said first impacting element at said resting position in advance of said slug cutting off step.

5. A process as set forth in claim 3, wherein the stroke of said first punch chip is variable within a predetermined range for varying said predetermined length for side-cutting in one stroke.

6. A turret punch press for side-cutting, comprising:
   an upper turret carrying a punch assembly;
   a lower turret carrying a die;
   a first punch chip carried in said punch assembly, said first punch chip being movable, within a predetermined stroke range, toward and away from a workpiece for which side-cutting is to be performed;
   at least one second punch chip carried in said punch assembly and movable, within a predetermined stroke range, toward and away from said workpiece for which side-cutting is to be performed;
   said punch assembly having a first active condition for side-cutting, wherein said first punch chip is projected toward said workpiece beyond said second punch chip and a second condition for removing a slug partially formed in the process of side-cutting performed at said first condition of said punch assembly, in which said second punch chip is projected toward said workpiece beyond said first punch chip; and
   impacting means for applying impact to said first and second punch chips, said first impacting means including a first impacting element corresponding to said first punch chip, and a second impacting element corresponding to said second punch chip;

said impacting means having a first active condition for side-cutting, in which said first impacting element is projected toward said first punch chip beyond said second impacting element, and a second active condition for removing a slug formed in the process of side-cutting performed at said first active condition of said impacting means, in which said second impacting element is projected toward said second punch chip beyond said first impacting element;

said impacting means being operable to alternately operate said first and second impacting elements for sequentially performing side-cutting process and slug removing process;

said first punch chip having first and second generally parallel cutting edges spaced apart a first distance for cutting two generally parallel sides of a slug to be removed from said workpiece; and said second punch chip having a third cutting edge extending generally transverse to said first and second cutting edges of said first punch chip, said third cutting edge being disposed within a width of said first and second cutting edges and having a length approximately equal to said first distance.

7. A turret punch press as set forth in claim 6, wherein said first punch chip is disposed in a first hollow punch guide and wherein said punch assembly further includes a second punch guide in which said second punch is disposed.

8. A turret punch press as set forth in claim 6, wherein the magnitude of projection of said first impacting element in said first active condition is variable for varying a length to be cut through one stroke of side-cutting process.

* * * * *